(12) United States Patent
Procopio

(10) Patent No.: US 8,458,193 B1
(45) Date of Patent: Jun. 4, 2013

(54) SYSTEM AND METHOD FOR DETERMINING ACTIVE TOPICS

(75) Inventor: Michael Jeffrey Procopio, Boulder, CO (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/363,126

(22) Filed: Jan. 31, 2012

(51) Int. Cl.
*G06F 17/30* (2006.01)

(52) U.S. Cl.
USPC .......................................... 707/749

(58) Field of Classification Search
USPC ................... 707/706, 723, 748, 749
See application file for complete search history.

(56) References Cited

U.S. PATENT DOCUMENTS

| | | | |
|---|---|---|---|
| 5,963,940 A | 10/1999 | Liddy et al. | |
| 6,236,987 B1 | 5/2001 | Horowitz et al. | |
| 6,349,307 B1 | 2/2002 | Chen | |
| 7,065,532 B2 | 6/2006 | Elder et al. | |
| 7,080,082 B2 | 7/2006 | Elder et al. | |
| 7,103,609 B2 | 9/2006 | Elder et al. | |
| 7,130,844 B2 | 10/2006 | Elder et al. | |
| 7,249,123 B2 | 7/2007 | Elder et al. | |
| 7,257,569 B2 | 8/2007 | Elder et al. | |
| 7,765,212 B2 | 7/2010 | Surendran et al. | |
| 7,853,594 B2 | 12/2010 | Elder et al. | |
| 7,860,811 B2 | 12/2010 | Flinn et al. | |
| 8,255,421 B2 * | 8/2012 | Maeda et al. ................ | 707/791 |
| 2004/0088315 A1 | 5/2004 | Elder et al. | |
| 2004/0088322 A1 | 5/2004 | Elder et al. | |
| 2004/0088649 A1 | 5/2004 | Elder et al. | |
| 2004/0254911 A1 | 12/2004 | Grasso et al. | |
| 2005/0198044 A1* | 9/2005 | Kato et al. ................... | 707/100 |
| 2006/0195461 A1 | 8/2006 | Lo et al. | |
| 2007/0078889 A1 | 4/2007 | Hoskinson | |
| 2007/0150470 A1 | 6/2007 | Brave et al. | |
| 2009/0287682 A1 | 11/2009 | Fujioka et al. | |
| 2009/0319907 A1 | 12/2009 | Tokuda | |
| 2010/0003658 A1* | 1/2010 | Fadel et al. ................... | 434/322 |
| 2010/0023311 A1* | 1/2010 | Subrahmanian et al. ......... | 704/2 |
| 2010/0094879 A1* | 4/2010 | Donnelly et al. ............. | 707/749 |
| 2010/0205541 A1* | 8/2010 | Rapaport et al. ............. | 715/753 |
| 2011/0016121 A1* | 1/2011 | Sambrani et al. ............. | 707/734 |
| 2011/0029534 A1* | 2/2011 | Maeda et al. ................ | 707/738 |
| 2011/0113040 A1 | 5/2011 | Bickel et al. | |
| 2011/0145719 A1 | 6/2011 | Chen et al. | |
| 2011/0258229 A1 | 10/2011 | Ni et al. | |
| 2012/0136812 A1 | 5/2012 | Brdiczka | |
| 2012/0173561 A1 | 7/2012 | Kim et al. | |
| 2012/0254191 A1* | 10/2012 | Sanyal et al. ................ | 707/744 |

OTHER PUBLICATIONS

U.S. Appl. No. 13/363,024, filed Jan. 31, 2012, Procopio, et al.
U.S. Appl. No. 13/363,067, filed Jan. 31, 2012, Procopio, et al.

(Continued)

*Primary Examiner* — Cam-Linh Nguyen
(74) *Attorney, Agent, or Firm* — Young, Basile, Hanlon & MacFarlane, P.C.

(57) ABSTRACT

A method for determining active topics may include receiving topic information for a document, the information including at least one topic and a weight for each topic, where the topic relates to content of the document, and the weight represents how strongly the topic is associated with the document. User activity information for the document, including a user activity value including at least one of a number of viewers and a number of editors of the document may be received. A topic intensity for each topic may be generated and stored by multiplying the user activity value for the document by the weight of the topic in the document. The topic intensity may be monitored over time. An alert may be generated based on the topic intensity.

18 Claims, 6 Drawing Sheets

OTHER PUBLICATIONS

U.S. Appl. No. 13/363,152, filed Jan. 31, 2012, Procopio.
U.S. Appl. No. 13/363,094, filed Jan. 31, 2012, Procopio, et al.
U.S. Appl. No. 13/363,210, filed Jan. 31, 2012, Procopio.
U.S. Appl. No. 13/363,169, filed Jan. 31, 2012, Procopio.
U.S. Appl. No. 13/363,195, filed Jan. 31, 2012, Procopio.
U.S. Appl. No. 13/363,221, filed Jan. 31, 2012, Procopio.
James Allan, "Topic Detection and Tracking-Event-Based Information Organization," 2002, Kluwer Academic Publishers, Norwell, Massachusetts, USA; http://books.google.com/books?hl=en&lr=&id=50hnLI_Jz3cC&oi=fnd&pg=PR9&dq=topic+detection+and+tracking+event-based+information+organization&ots=nfu5nDwUa0&sig=U2ITFv2_AMnciqo9J8WLaS91v98#v=onepage&q=topic%20detection%20and%20tracking%20event-based%20inform&f=false (last visited on Jan. 31, 2012).
Stefan Siersdorfer and Sergej Sizov, "Automatic Document Organization in a P2P Environment," 2006, Springer, Berlin, Germany; http://www.springerlink.com/content/27140h768278629r/ (last visited on Jan. 31, 2012).
Dr. E. Garcia, "Cosine Similarity and Term Weight Tutorial," http://www.miislita.com/information-retrieval-tutuorial/cosine-similarity-tutorial.html (last visited on Jan. 30, 2012).
U.S. Office Action, mailed on Nov. 21, 2012, in the related U.S. Appl. No. 13/363,169.
Notice of Allowance mailed on Feb. 11, 2013, in the related U.S. Appl. No. 13/363,221.

* cited by examiner

300
SNAPSHOT AT T=0 302

| DOCUMENT ID | TOPIC (WEIGHT) | NO. OF ACTIVE USERS |
|---|---|---|
| DOCUMENT 1 | A (0.70), B (0.30) | 5 |
| DOCUMENT 2 | B (0.05), C (0.95) | 2 |
| DOCUMENT 3 | C (1.0) | 3 |

SNAPSHOT AT T=1 304

| DOCUMENT ID | TOPIC (WEIGHT) | NO. OF ACTIVE USERS |
|---|---|---|
| DOCUMENT 1 | A (0.40), B (0.60) | 5 |
| DOCUMENT 2 | B (0.30), C (0.60), D (0.10) | 3 |
| DOCUMENT 3 | C (1.0) | 1 |

SNAPSHOT AT T=2 306

| DOCUMENT ID | TOPIC (WEIGHT) | NO. OF ACTIVE USERS |
|---|---|---|
| DOCUMENT 1 | A (0.30), B (0.70) | 11 |
| DOCUMENT 2 | B (0.50), C (0.30), D (0.20) | 8 |
| DOCUMENT 3 | C (1.0) | 0 |

410 — TOPIC INTENSITY FOR DOCUMENT SUBSET (DOC. 1 & DOC. 2) AT T=0 — 420, 402

| TOPIC | TOPIC INTENSITY VALUE(S) | | |
|---|---|---|---|
| | DOC. 1 | DOC. 2 | TOTAL |
| A | (5 * 0.70) | (2 * 0.0) | 3.5 |
| B | (5 * 0.30) | (2 * 0.05) | 1.6 |
| C | (5 * 0.0) | (2 * 0.95) | 1.9 |
| D | (5 * 0.0) | (2 * 0.0) | 0.0 |

412 — A, 414 — B, 416 — C, 418 — D
422, 424, 426, 428

TOPIC INTENSITY FOR DOCUMENT SUBSET (DOC. 1 & DOC. 2) AT T=1 — 430, 404

| TOPIC | TOPIC INTENSITY VALUE(S) | | |
|---|---|---|---|
| | DOC. 1 | DOC. 2 | TOTAL |
| A | (5 * 0.40) | (3 * 0.0) | 2.0 |
| B | (5 * 0.60) | (3 * 0.30) | 3.9 |
| C | (5 * 0.0) | (3 * 0.60) | 1.8 |
| D | (5 * 0.0) | (3 * 0.10) | 0.30 |

432, 434, 436, 438

TOPIC INTENSITY FOR DOCUMENT SUBSET (DOC. 1 & DOC. 2) AT T=2 — 440, 406

| TOPIC | TOPIC INTENSITY VALUE(S) | | |
|---|---|---|---|
| | DOC. 1 | DOC. 2 | TOTAL |
| A | (11 * 0.30) | (8 * 0.0) | 3.3 |
| B | (11 * 0.70) | (8 * 0.50) | 11.7 |
| C | (11 * 0.0) | (8 * 0.30) | 2.4 |
| D | (11 * 0.0) | (8 * 0.20) | 1.6 |

SYSTEM AND METHOD FOR DETERMINING ACTIVE TOPICS

CROSS REFERENCES TO RELATED APPLICATIONS

The following U.S. patent applications are filed concurrently herewith and are assigned to the same assignee hereof and contain subject matter related, in certain respect, to the subject matter of the present application. These patent applications are incorporated herein by reference.

Ser. No. 13/363,024 is now pending, filed Jan. 31, 2012 for "SYSTEM AND METHOD FOR COMPUTATION OF DOCUMENT SIMILARITY";

Ser. No. 13/363,067 is now pending, filed Jan. 31, 2012 for "SYSTEM AND METHOD FOR INDEXING DOCUMENTS";

Ser. No. 13/363,152 is now pending, filed Jan. 31, 2012 for "SYSTEM AND METHOD FOR CONTENT-BASED DOCUMENT ORGANIZATION AND FILING";

Ser. No. 13/363,094 is now pending, filed Jan. 31, 2012 for "SYSTEM AND METHOD FOR AUTOMATICALLY DETERMINING DOCUMENT CONTENT";

Ser. No. 13/363,210 is now pending, filed Jan. 31, 2012 for "SYSTEM AND METHOD FOR DETERMINING TOPIC AUTHORITY";

Ser. No. 13/363,169 is now pending, filed Jan. 31, 2012 for "SYSTEM AND METHOD FOR DETERMINING TOPIC INTEREST";

Ser. No. 13/363,195 is now pending, filed Jan. 31, 2012 for "SYSTEM AND METHOD FOR DETERMINING SIMILAR USERS"; and Ser. No. 13/363,221 is now pending, filed Jan. 31, 2012 for "SYSTEM AND METHOD FOR DETERMINING SIMILAR TOPICS."

BACKGROUND

Databases may include large quantities of documents including content covering a wide variety of topics. Many different users may simultaneously interact with documents in a database, and it may be desirable to identify trending and/or active document topics. Given the large quantities of documents, however, identifying trending and/or active topics may be computationally cumbersome.

SUMMARY

Briefly, aspects of the present disclosure are directed to methods and systems for determining active topics, which may include receiving topic information for a document, the information including at least one topic and a weight for each topic, where the topic relates to content of the document, and the weight represents how strongly the topic is associated with the document. User activity information for the document including a user activity value including at least one of a number of viewers and a number of editors of the document may be received. A topic intensity for each topic may be generated and stored by multiplying the user activity value for the document by the weight of the topic in the document. The topic intensity may be monitored over time. An alert may be generated based on the topic intensity.

This SUMMARY is provided to briefly identify some aspects of the present disclosure that are further described below in the DESCRIPTION. This SUMMARY is not intended to identify key or essential features of the present disclosure nor is it intended to limit the scope of any claims.

The term "aspects" is to be read as "at least one aspect". The aspects described above and other aspects of the present disclosure described herein are illustrated by way of example(s) and not limited in the accompanying figures.

BRIEF DESCRIPTION OF THE DRAWINGS

A more complete understanding of the present disclosure may be realized by reference to the accompanying figures in which:

FIG. 3 is a diagram of document signature snapshots and user activity information for one or more documents according to aspects of the present disclosure;

FIG. 4 is a diagram of topic intensities according to aspects of the present disclosure;

Figure 1:
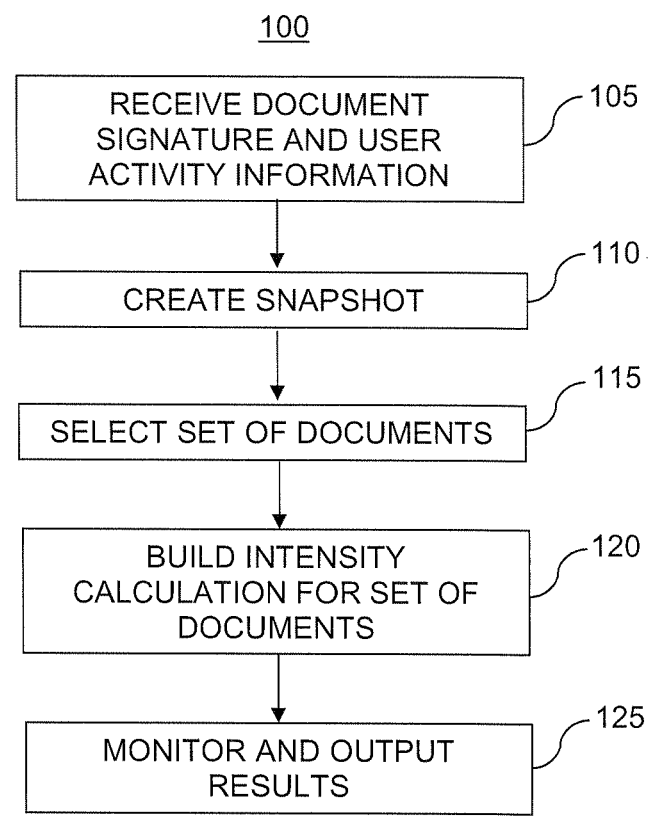
FIG. 1 is a flowchart of a method according to aspects of the present disclosure.

The illustrative aspects are described more fully by the Figures and detailed description. The present disclosure may, however, be embodied in various forms and is not limited to specific aspects described in the Figures and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles and aspects of the disclosure, as well as specific examples thereof, are intended to encompass both structural and functional equivalents thereof. Additionally, it is intended that such equivalents include both currently known equivalents as well as equivalents developed in the future, e.g., any elements developed that perform the same function, regardless of structure.

Thus, for example, it will be appreciated by those skilled in the art that any block diagrams herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the Figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and nonvolatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the drawings are not drawn to scale.

Figure 6:
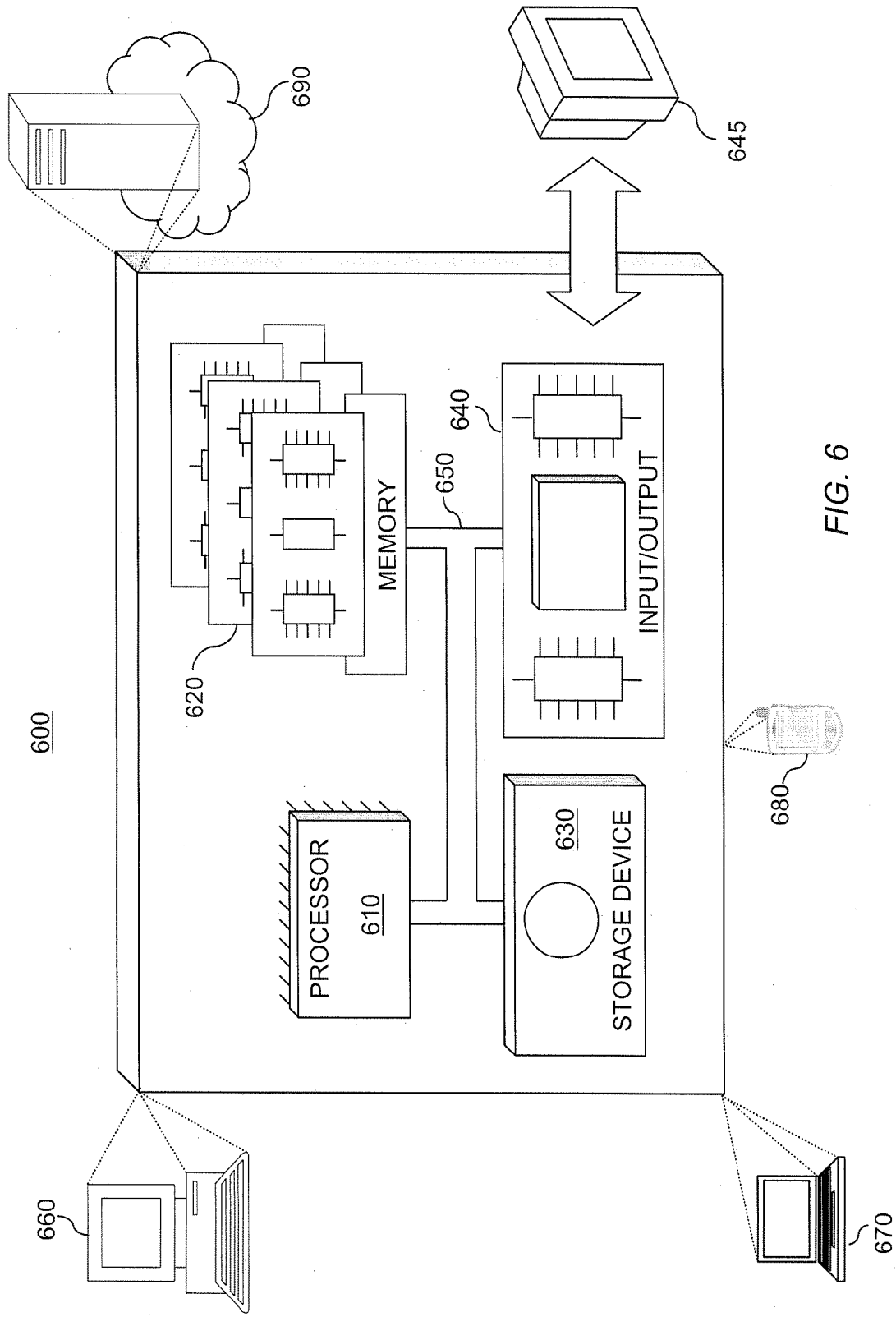
FIG. 6 is a schematic diagram depicting a representative computer system for implementing and exemplary methods and systems for determining active topics according to aspects of the present disclosure.

In FIG. 1, there is shown a flow diagram 100, which defines steps of a method according to aspects of the present disclosure. Methods and systems of the present disclosure may be implemented using, for example, a computer system 600 as depicted in FIG. 6 or any other system and/or device.

In operation 105, a document signature and user activity information for a document may be received by, for example, system 600. A document signature (e.g., topic information, signature information) may include, for example, at least one topic and a weight for each topic. Topic(s) may, for example, relate to content and/or text of a document, and a weight for a topic may, for example, represent how strongly the topic is associated with the document.

Documents discussed herein may include document text or content. Document text may be, for example, a text-based representation of a document. The document may include text (e.g., a word processing document, text file, portable document format (pdf), spreadsheet or presentation), or may have text associated therewith, such as in a transcript, when the document is a video (e.g., a web-based video or any other type of video), an audio file (e.g., an audio recording, podcast, or any type of audio), or another type of electronically stored file. Document text may be present in a document text file separate from the document. In that case, the document text file may be linked to and/or stored with the document and/or may be stored separately. It will be understood that operations involving the text of a document may be performed on or with the document or the document text file depending on the location of text.

Topics may be, for example, categories, abstract ideas, subjects, things, and/or concepts representing the content or subject matter of a document. Topics may be, for example, an abstract notion of what a document text pertains to, is related to, or is about. A topic may, in some aspects, be a concept that at least a portion of the document is about. A topic may or may not be a term present in a document text but may be, for example, associated with one or more terms present in a document and may be generated by natural language processing or other processes based on one or more terms in a document and/or other information. For example, a document may include text about cars, planes, and boats, all of which appear as terms verbatim in the document. More abstractly, however, it may be determined that the document is about "vehicles" and "modes of transportation." Topics associated with the document may, therefore, be "vehicles," "modes of transportation," and/or other topics.

A weight (e.g., a topic weight or confidence score) may represent how strongly a topic is associated with a document (e.g., document text). A weight may be, for example, a percentage (e.g., between 0% and 100%), a numeric value (e.g., between 0 and 1.0 or any other range), a vector, a scalar, or another parameter, which quantifies or represents how strongly a topic is associated with a document. For example, a document may include text or information relating to one or more topics, and a weight associated with each topic may represent or quantify how much a document text pertains to, is about, or is related to each topic. A sum of weights for all topics associated with a document may, for example, be equal to 1.0, 100%, or another value.

User activity information for a document may include a user activity value including at least one of a number of editors, a number of viewers, and possibly a number of other types of users of a document. An editor of a document (e.g., a document editor, editor) may be, for example, a user who alters, modifies, changes, creates and/or deletes a document. An editor may, for example, add, remove, alter, modify, or change information, content, and/or text in a document. An editor may be, for example, a document author, creator, moderator, and/or owner. An editor may be, for example, a user with permission or access to modify, alter, or change a document and/or who is, for example, modifying the document. In some aspects, an editor may be a user who has modified a document within a predetermined period of time (e.g., within one week or any other period of time).

A viewer of a document (e.g., a document viewer or viewer) may be an active document user who does not modify, alter, and/or change a document (e.g., document text). A viewer of a document may be, for example, a user is viewing the document, who is reading the document, who is scrolling through the document, who has the document open, and/or who is otherwise interacting with the document. A viewer may, in some aspects, be a document user who has permission and/or access to read a document (e.g., basic permission(s)) but does not have permission and/or access to modify, alter, or change the document.

In operation 110, a snapshot may be created. A snapshot may represent a current state of a system (e.g., system 600), database (e.g., including one or more documents in one more sets documents), and/or device. A snapshot may include, for example, information or data related to one more documents (e.g., user activity information, topic information, and/or other information for the documents) measured, recorded, and/or received at a point in time, an instant in time, over a period of time (e.g., a time window, window of time), over a timeframe, and/or over a time interval. A predetermined point in time, period of time, and/or a time interval may be defined by, for example, a user, system 600, and/or another system or device. Snapshots may be created, measured, taken, and/or received at predetermined time intervals. For example, a snapshot may be created every minute, hour, or any other time interval. Snapshots may, in some aspects, be generated by sampling and/or measuring information relating to a document (e.g., user activity information, document signature information) at a predetermined sample rate over an interval of time (e.g., 2 hours, 1 day, 30 minutes, or any other time interval). Snapshots may, in some aspects, be average values of information relating to a document (e.g., user activity information, document signature information) measured over an interval of time (e.g., 2 hours, 1 day, 30 minutes, or any other time interval).

A snapshot may include information relating to a document including one or more topic weights, user activity information for the document, and/or other information associated with or related to the document. Activity information for a document may include a user activity value including a number of active document users.

In operation 115, a set of documents may be selected from a plurality of documents (e.g., a larger set of documents). A selection of a set of a plurality of documents may be received by, for example, system 600. A selection of a subset of documents may be generated in response to user input, input from system 600, and/or input from another system or device. In some aspects, a subset of a plurality of documents may be selected in a screening and/or filtering process based on document topics, document attributes (e.g., characteristics, profile, location, or other information relating to viewers, editors, and/or users of the document), and/or other parameters.

In operation 120, an intensity calculation may be built, generated, or computed for the set of documents. A topic intensity for topics in a document and/or set of documents may be generated and stored. A topic intensity for a topic may be generated by multiplying a user activity value (e.g., a number of viewers, a number of editors, and/or other users of a document) for a document by a weight of the same topic in the document. A topic intensity may be stored, for example, in system 600 or another device or system. Each topic in a document may be generated and stored. Topic intensities for each topic in each document in a set and/or subset of documents may be generated and stored. Any number of topic intensities for any number of documents may, therefore, be generated and stored in, for example, system 600 or another system or device.

In operation 125, results may be monitored and output to, for example, a user, a component of system 600, or another system or device. Results may include, for example, trending topics, topic intensity values, identities of subsets of documents, document characteristics, user characteristics, and/or representation(s) thereof. Topic intensity may be monitored by, for example, comparing topic intensities to a threshold topic intensity. Topic intensity for each topic in one or more documents in a set of documents may be monitored. Topic intensity may be monitored over time by comparing a rate of change of topic intensity for a topic to a threshold topic intensity rate of change.

Topic intensity for a topic, a rate of change of topic intensity for a topic, and/or other topic intensity related information may be output to a user, a component of system 600, and/or another system. In some aspects, a representation of topic intensity for a topic, rate of change of topic intensity for a topic, and/or topic intensity information may be output. A representation may be, for example, a list, a graphical representation (e.g., a graphical model, graph, plot, bar graph, pie chart, or other graphical representation), a word cloud, or other type of data representing or including topics and/or corresponding topic intensities.

In some aspects, an alert may be generated based on a topic intensity. An alert (e.g., an alarm, warning, signal, or other type of alert) may, for example, be a visual alert (e.g., a text alert, a window, a pop-up window, flashing text, colors, a picture, icon, or other type of visual alert), audible alert (e.g., an alarm, audio, signal, text to speech (TTS), auditory icon, earcon, spearcon, or other type of audio alert), and/or other type of alert. An alert may include, for example, a list of one or more topics and/or corresponding topic intensities, a representation of one or more topics and/or topic intensities, or other information. An alert may, for example, be output from system 600.

In some aspects, an alert may be generated when a topic intensity for one topic reaches a threshold level and/or changes at a threshold rate. A topic intensity for a topic may reach a topic intensity threshold level if, for example, the topic intensity is equal to or greater than the topic intensity threshold. Similarly, a rate of change of topic intensity may change at threshold rate if a rate of change of topic intensity is equal to or greater than a threshold rate of change of topic intensity (e.g., a threshold rate).

A threshold topic intensity (e.g., a threshold level) may be a fixed topic intensity threshold (e.g., a predetermined topic intensity threshold, a static topic intensity threshold), an automatically generated topic intensity threshold (e.g., a varying topic intensity threshold), or any other type of topic intensity threshold. A fixed topic intensity threshold may be generated by, for example, a user, system 600, or any other system or process. A fixed topic intensity threshold may be based, for example, on historical topic intensity data, user preferences, desired system 600 sensitivity, or other parameters.

An automatically generated topic intensity threshold level may be, for example, generated based on one or more stored topic intensities (e.g., historical topic intensity data). An automatically generated topic intensity threshold level may be, for example, a maximum, minimum, average, mean, and/or mode of stored topic intensity values over a period of time. For example, an automatically generated topic intensity threshold may be an average of stored topic intensity values over a period of one month, one day, two hours, or any other period of time (e.g., prior to generation of the topic intensity threshold).

A threshold topic intensity rate of change (e.g., a threshold rate) may be a fixed topic intensity threshold rate (e.g., a predetermined topic intensity threshold rate, a static topic intensity rate threshold), an automatically generated topic intensity threshold (e.g., a varying topic intensity threshold rate), or any other type of topic rate intensity threshold. A topic intensity rate threshold may be generated by, for example, a user, system 600, or any other system or process.

An automatically generated threshold rate may be, for example, a maximum, average, mean, and/or mode of stored topic intensity rates (e.g., stored topic intensity rates for a topic) over a period of time.

In some aspects, a short term average of topic intensity values may be compared to a long term average or topic intensity values using a short term average/long term average (STA/LTA) approach. An alert may be generated and output, if the comparison exceeds a predetermined threshold topic intensity. A short term average of topic intensity values may be, for example, an average of topic intensity values over a relatively short, small, or brief time window (e.g., 1 minute). A long term average of topic intensity values may be, for example, an average of topic intensity values over a relatively long, large, or extended time window (e.g., 1 day, 1 month, etc.). If a difference and/or absolute value of a difference between a short term average of topic intensity values and a long term average of topic intensity values exceeds a threshold topic intensity, an alert may be generated based on the topic intensity and may be output to user.

In some aspects, a short term average of topic intensity rates may be compared to a long term average of topic intensity rates using an STA/LTA approach. If a difference and/or absolute value of a difference between a short term average of topic intensity rates of change and a long term average of topic intensity rates of change exceeds a threshold rate, an alert may be generated based on the topic intensity and may be output to user.

In some aspects, a viewer alert may be generated. A viewer alert may be generated based, for example, on a viewer topic intensity for each topic in a document. A viewer topic intensity for a topic may include, for example, a product of a viewer activity value for a document and a weight of that topic in the document. A viewer activity value may include, for example, a number of viewers of the document, a number of active viewers of the document within a period of time, and/or other document viewer related information. A viewer alert may be generated if and/or when a viewer topic intensity for a topic reaches a threshold level or changes at a threshold rate. A viewer alert may be an audible alert, a visual alert, or any other type of alert. A viewer alert may be output, for example, to a user, a component of system 600, or another system or device.

In some aspects, an editor alert may be generated. An editor alert may be generated based, for example, on an editor topic intensity for each topic in a document, set of documents, and/or subset of documents. An editor topic intensity for a topic may include, for example, a product of an editor activity value for a document and a weight of that topic in the document. An editor activity value may include, for example, a number of editors of the document, a number of active editors of the document within a period of time, and/or other document editor related information. An editor alert may be generated if and/or when an editor topic intensity for a topic reaches a threshold level or changes at a threshold rate. An editor alert may be an audible alert, a visual alert, or any other type of alert. An editor alert may be output, for example, to a user, a component of system 600, or another system or device.

In some aspects, one or more trending topics may be determined based on monitored topic intensity. Trending topics (e.g., spiking topics, hot topics, significant topics) may include, for example, topics associated with a topic intensity rate of change above a predetermined threshold rate (e.g., a fixed threshold rate, varying threshold rate). Topics associated with a rate of change above a threshold rate may be determined, for example, by comparing a rate of change of topic intensity over time period to threshold topic intensity rate of change, using an STA/LTA approach, or using other methods. Using an STA/LTA approach, if a difference and/or absolute value of a difference between a short term average of topic intensity values and a long term average of topic intensity values exceeds a threshold, it may be determined that a topic associated with the topic intensity is a spiking, hot, significant and/or trending topic.

In some aspects, an identity of one or more subsets of documents associated with at least one trending topic may be output to a user. A subset of documents associated with a trending topic may be, for example, a subset or set of documents including one or more documents that include document text and/or content including the trending topic.

According to some aspects, one or more common attributes associated with a subset of documents may be identified. For example, one or more common attributes associated with a subset of documents including at least one trending topic may be identified. Attributes associated with a document or subset of documents may include, for example, user characteristics, properties, traits, demographics, and/or other information related to user. User characteristics may be, for example, an age, gender, location, occupation, job title, or any other information relating to a document user (e.g., a document editor, viewer or other type of user). Attributes may include document characteristics (e.g., type of document, file format, document security, or other characteristics). Attributes may include attributes of system(s) used to interact with document (e.g., operating system, computer type, mobile device type, or other system attributes). Common attributes may be, for example, attributes that are common to one or more documents in a set and/or subset of documents. Common attributes may, for example, be output to a user (e.g., using a component of system 600).

In some aspects, common attributes may, for example, be identified in response to a user request regarding a target or query topic. For example, a user may request attributes of users (e.g., gender, age range, and occupation) actively using (e.g., viewing, editing, or otherwise using) documents related to a topic (e.g., politics). In response to a request, attributes of users (e.g., gender, age range, and occupation) actively using document related to the topic may be identified and/or output to the user. For example, an age range, gender percentage, and top five occupations of all users actively using documents including content about politics may be identified and/or output to the user.

Figure 2:
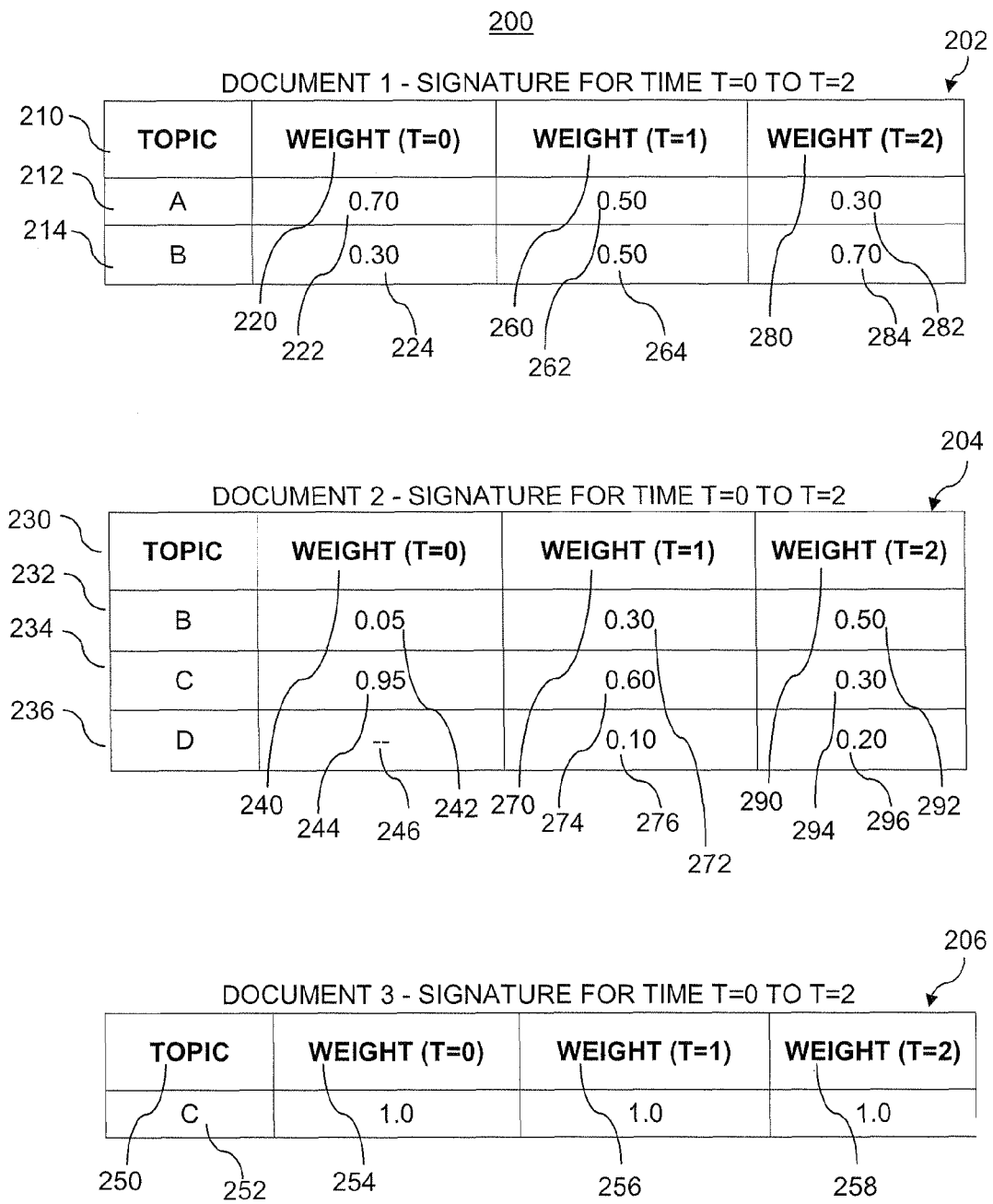
FIG. 2 is a diagram of document signatures according to aspects of the present disclosure.

In FIG. 2, there is shown a diagram 200 of document signatures according to aspects of the present disclosure. One or more documents (e.g., Document 1 202, Document 2 204, Document 3 206) may include one or more topics (e.g., Document 1 topics 210, Document 2 topics 230, Document 3 topics 250). A document signature (e.g., a topic information) including, for example, topics (e.g., Document 1 topics 210, Document 2 topics 230, and Document 3 topics 250) and a weight for each topic may be received at predefined time intervals (e.g., times T=0, T=1, T=2, and or other time intervals). Time interval(s) may be determined and/or set based on user input, system settings, system activity levels (e.g., a number of documents being used, edited, viewed, etc.), or other parameters.

In this example, document signatures for Document 1 202, Document 2 204, Document 3 206 may be calculated at time zero (e.g., T=0). A document signature for Document 1 202 at a time zero (e.g., T=0) including topics 210 and weights 220 associated with each topic may be received at, for example, system 600. A document signature for Document 1 202 at time zero may include topic A 212 and weight for topic A 222 (e.g., 0.70) as well as topic B 214 and a weight for topic B 224 (e.g., 0.30). A document signature for Document 1 202 at time T=0 including a weight for topic A 222 of 0.70 and a weight for topic B 224 of 0.30 may indicate that Document 1 202 includes text of which 30% is about or pertains to topic A 212 and 70% about topic B 214.

A document signature for Document 2 204 at a time T=0 (e.g., time zero) including topics 230 and weights 240 associated with each topic may be received at, for example, system 600. A document signature for Document 2 204 at time zero may include topic B 232, topic C 234, and topic D 236 as well as a weight for topic B 242 (e.g., 0.05), a weight for topic C 244 (e.g., 0.95), a weight for topic D 246 (e.g., zero). A document signature for Document 2 204 at time T=0 including a weight for topic B 242 of 0.05, a weight for topic C 244 of 0.95 and a weight for topic D 246 of 0.0 may indicate that Document 2 204 at T=0 includes text, which is 5% about topic B 232, 95% about topic C 234, and 0% about topic D.

A document signature for Document 3 206 at a time T=0 (e.g., time zero) including a topic 250 and a weight 254 associated with the topic may be received at, for example, system 600. A document signature for Document 3 206 at time zero (e.g., T=0) may include topic C 252 and a weight for topic C 254 (e.g., 1.0). A document signature for Document 3 206 at time T=0 including a weight for topic C 254 of 1.0 may indicate that Document 3 206 at T=0 includes text, which is 100% or entirely about topic C 252.

Document signatures for Document 1 202, Document 2 204, Document 3 206 may be calculated at a second time, referred to here as time one (e.g., T=1). A second time or time one (e.g., T=1) may occur any amount, interval, and/or period of time after T=0 (e.g., T=1 may be 1 hour, 20 minutes, 2 days, or any other amount of time after T=0). A document signature for Document 1 202 at time one (e.g., T=1) including topics 210 and weights 260 associated with each topic may be received at, for example, system 600. A document signature for Document 1 202 at a time one (e.g., T=1) may include topic A 212 and weight for topic A 262 (e.g., 0.50) as well as topic B 214 and a weight for topic B 264 (e.g., 0.50). A document signature for Document 1 202 at time T=1 including a weight for topic A 262 of 0.50 and a weight for topic B 264 of 0.50 may indicate that Document 1 202 includes text of which 50% (e.g., half) is about or pertains to topic A 212 and 50% (e.g., half) pertains to topic B 214. Between time zero (e.g., T=0) and time one (e.g., T=1) Document 1 202 may be modified (e.g., by a document editor) to remove content relating to topic A 212 and/or add content related to topic B 214. Between time zero (e.g., T=0) and time one (e.g., T=1), a percentage of Document 1 202 content about topic A 212 may be reduced from 70% to 50%, and a percentage of Document 1 202 content about topic B 214 may be increased from 30% to 50%

Topic weights (e.g., topic A 212 and topic B 214) may represent a percentage and/or amount of document text that pertains to a topic; therefore, the fact that a topic weight decreases may not necessarily indicate that content relating to that topic has been removed from the document but may indicate that content relating to other topics has been added. Similarly, the fact that a topic weight increases may not necessarily indicate that content relating to that topic has been added to document but may indicate that content related to other topics has been removed.

A document signature for Document 2 204 at a time one (e.g., T=1) including topics 230 and weights 270 associated with each topic may be received at, for example, system 600. A document signature for Document 2 204 at time one (e.g., T=1) may include topic B 232, topic C 234, and topic D 236 as well as a weight for topic B 272 (e.g., 0.30), a weight for topic C 274 (e.g., 0.60), a weight for topic D 276 (e.g., 0.10). A document signature for Document 2 204 at a time T=1 including a weight for topic B 272 of 0.30, a weight for topic C 274 of 0.60 and a weight for topic D 276 of 0.10 may indicate that Document 2 204 at T=1 includes text, which is 30% about topic B 232, 60% about topic C 234, and 10% about topic D 236. Between time zero (e.g., T=0) and time one (e.g., T=1) Document 2 204 may be modified (e.g., by a document editor) to add content relating to topic B 232, remove content related to topic C 234, and/or add content related to topic D 236, such that a percentage of Document 2 204 content about topic A 232 is increased from 5% to 30%, a percentage content about topic C 264 is decreased from 95% to 60%, and content about topic D 236 is added (e.g., increased from 0% to 10%) between time zero (e.g., T=0) and time one (e.g., T=1). Another possible reason for the addition of topic D to Document 2 at T=1 is that new topics may be added and/or topic definitions may change. For example, topic D may have been created or redefined between T=0 and T=1 so that topic D applies to Document 2.

A document signature for Document 3 206 at a time one (e.g., T=1) including a topic 250 and weights 256 associated with the topic may be received at, for example, system 600. A document signature for Document 3 206 at time one (e.g., T=1) may include topic C 252 and a weight for topic C 256 (e.g., 1.0). Document 3 206 may be unchanged between time zero and time one.

Document signatures for Document 1 202, Document 2 204, Document 3 206 may be calculated at a third point, moment, instant or interval in time: time two (e.g., T=2). A document signature for Document 1 202 (e.g., including topics 210 and weights 280 for each topic) at time T=2 including a weight for topic A 282 of 0.30 and a weight for topic B 284 of 0.70 may indicate that Document 1 202 includes text which is 30% about topic A 212 and 70% about topic B 214. A document signature for Document 2 204 (e.g., including topics 230 and weights 290 for each topic) at a time T=2 including a weight for topic B 292 of 0.50, a weight for topic C 294 of 0.30, and a weight for topic D 296 of 0.20 may indicate that Document 2 204 at T=2 includes text, which is 50% about topic B 232, 30% about topic C 234, and 20% about topic D 236. A document signature for Document 3 206 (e.g., including topic(s) 250 and weight(s) 258 for each topic) at time two (e.g., T=2) may include topic C 252 and a weight for topic C 258 (e.g., 1.0). Document 3 206 may be unchanged between time zero and time two.

Document signatures for Document 1 202, Document 2 204, Document 3 206 may of course be received, calculated, or measured at any number of points, moments, instants, and/or intervals in time: time N (e.g., T=N). Time may, for example, be determined by a user, based on system activity, based on a number of active documents and/or other parameters.

FIG. 3 shows a schematic diagram 300 depicting topics, weights, and a topic index associated with one or more documents according to aspects of the present disclosure. One or more snapshots (e.g., time zero snapshot 302, time one snapshot 304, time two snapshot 306) may be created and/or received by, for example, system 600. A snapshot may, for example, include information relating to one or more documents 310 created, measured, and/or recorded at a point in time. Snapshots (e.g., time zero snapshot 302, time one snapshot 304, time two snapshot 306) may be created, measured, and/or recorded at predetermined time intervals (e.g., every 10 minutes, 1 hour, or any other interval of time). Information related to one or more documents may include, for example, topics and associated weights 320, 340, 360 a number of active users 330, 350, 370 (e.g., a number of editors, viewers, and/or other users), and other information. The topics and weights shown in FIG. 3 may have been taken from the tables in FIG. 2.

A snapshot 302 at time zero (e.g., T=0) may include information related to Document 1 312, Document 2 314, and Document 3 316. Information related to documents 310 may include topic information 320 (e.g., including topics and associated weights for each topic) and user activity information 330 (e.g., a number of active users) for each document 310.

A snapshot at time zero (e.g., T=0) may include Document 1 topic information 322 and Document 1 activity information 332. At a time zero (e.g., T=0), Document 1 topic information 322 may indicate that Document 1 312 includes 70% (e.g., 0.70) content related to a topic A and 30% (e.g., 0.30) content related to a topic B. At time zero (e.g., T=0), Document 1 activity information 332 may indicate that Document 1 312 has five active users (e.g., editors, viewers, and/or other type of users).

A snapshot 302 at time zero (e.g., T=0) may include Document 2 topic information 324 and Document 2 activity information 334. At time zero (e.g., T=0), Document 2 topic information 324 may indicate that Document 2 314 includes 5% (e.g., 0.05) content related to a topic B and 95% (e.g., 0.95) content related to a topic C. At time zero (e.g., T=0), Document 2 activity information 334 may indicate that Document 2 314 has two active users.

A snapshot 302 at time zero (e.g., T=0) may include Document 3 topic information 326 and Document 3 activity information 336. At time zero (e.g., T=0), Document 3 topic information 326 may indicate that Document 1 316 includes 100% (e.g., 1.0) content related to a topic C. At time zero (e.g., T=0), Document 1 activity information 336 may indicate that Document 1 316 has three active users.

A snapshot 304 at time one (e.g., T=1) may include information related to Document 1 312, Document 2 314, and Document 3 316. Information related to documents 310 may include topic information 340 (e.g., including topics and associated weights for each topic) and user activity information 350 (e.g., a number of active users) of each document 310.

A snapshot at time one (e.g., T=1) may include Document 1 topic information 342 and Document 1 activity information 352. At a time one (e.g., T=1), Document 1 topic information 342 may indicate that Document 1 312 includes 40% (e.g., 0.40) content related to a topic A and 60% (e.g., 0.60) content related to a topic B. At time one (e.g., T=1), Document 1 activity information 352 may indicate that Document 1 312 has five active users.

A snapshot 304 at time one (e.g., T=1) may include Document 2 topic information 344 and Document 2 activity information 354. At time one (e.g., T=1), Document 2 topic information 344 may indicate that Document 2 314 includes 30% (e.g., 0.30) content related to a topic B, 60% (e.g., 0.60) content related to a topic C, and 10% (e.g., 0.10) content related to topic D. Content related to topic D may, for example, have been added to Document 2 314 in a time interval between time zero (e.g., T=0) and time one (e.g., T=1). At time one (e.g., T=1), Document 2 activity information 354 may indicate that Document 2 314 has three active users.

A snapshot 304 at time one (e.g., T=1) may include Document 3 topic information 346 and Document 3 activity information 356. At time one (e.g., T=1), Document 3 topic information 346 may indicate that Document 3 316 includes 100% (e.g., 1.0) content related to a topic C. At time one (e.g., T=1), Document 3 activity information 356 may indicate that Document 3 316 has one active user.

A snapshot 306 at time two (e.g., T=2) may include information related to Document 1 312, Document 2 314, and Document 3 316. Information related to documents 310 may include topic information 360 (e.g., including topics and associated weights for each topic) and user activity information 370 (e.g., a number of active users) of each document 310.

A snapshot at time two (e.g., T=2) may include Document 1 topic information 362 and Document 1 activity information 372. At a time one (e.g., T=1), Document 1 topic information 362 may indicate that Document 1 312 includes 30% (e.g., 0.30) content related to a topic A and 70% (e.g., 0.70) content related to a topic B. At time two (e.g., T=2), Document 1 activity information 372 may indicate that Document 1 312 has eleven active users.

A snapshot 306 at time two (e.g., T=2) may include Document 2 topic information 364 and Document 2 activity information 374. At time two (e.g., T=2), Document 2 topic information 364 may indicate that Document 2 314 includes 50% (e.g., 0.50) content related to a topic B, 30% (e.g., 0.30) content related to a topic C, and 20% (e.g., 0.20) content related to topic D. At time two (e.g., T=2), Document 2 activity information 374 may indicate that Document 2 314 has eight active users.

A snapshot 306 at time two (e.g., T=2) may include Document 3 topic information 366 and Document 3 activity information 376. At time two (e.g., T=2), Document 3 topic information 366 may indicate that Document 3 316 includes 100% (e.g., 1.0) content related to a topic C. At time two (e.g., T=2), Document 3 activity information 366 may indicate that Document 3 316 has zero active users.

FIG. 4 shows a diagram 400 depicting documents and similarity scores associated with one or more documents according to aspects of the present disclosure. A subset of multiple or a plurality of documents may be identified and/or selected. A selection of a subset of documents may be generated in response to user input. A subset of documents may, for example, be selected to determine active, trending, or hot topics within the subset of documents. In this example, Document 1 312 and Document 2 314 may be selected.

A topic intensity for each topic (e.g., in a subset of documents) may be generated and stored. A topic intensity for each topic in a subset of documents may be generated and stored at predetermined time intervals. For example, topic intensity for topics in a document set at T=0 402, topic intensity at T=1 404, and topic intensity at T=2 406 may be generated and stored. Topic intensity points or values 420, 430, 440 for one or more topics 410 in a subset of documents (e.g., Document 1 312 and Document 2 314) may be generated. Topic intensity points or values 420, 430, 440 for a topic may be generated by, for example, multiplying a user activity value for a document by a weight of the topic in the document.

Topic intensity values 420 for documents in a document set at time zero 402 (e.g., T=0) including a Topic A intensity 422, a Topic B intensity 424, a Topic C intensity 426, and Topic D intensity 428 may be generated and stored. A topic intensity for a topic 420 (e.g., a topic intensity value 420 for Topic A 412, Topic B 414, Topic C 416, or Topic D 418) may be a sum of products of a user activity for each document (e.g., in a document subset) and a weight of that topic in that document. A topic intensity for Topic A 422 (e.g., 3.5) at time T=0 may be, for example, a sum of a product of a Document 1 user activity value 332 (e.g., 5 users) and a weight of Topic A in Document 1 222 (e.g., 0.70) and a Document 2 user activity value 334 (e.g., 2 users) and a weight of Topic A in Document 2 (e.g., 0.0). A weight of a topic in a document equal to zero may, for example, indicate that zero percent (e.g., 0%) and/or none of that document is about that topic. A topic intensity for Topic B 424 (e.g., 1.6) at time T=0 may be, for example, a sum of a product of a Document 1 user activity value 332 (e.g., 5 users) and a weight of Topic B in Document 1 224 (e.g., 0.30) and a product of a Document 2 user activity value 334 (e.g., 2 users) and weight of topic B in Document 2 242 (e.g., 0.05). Similarly, a topic intensity for Topic C 426 (e.g., 1.9) at time T=0 and a topic intensity for Topic D 428 (e.g., 0.0) may be generated. A topic intensity of value of zero (e.g., topic intensity for Topic D 428) may, for example, indicate that no documents in a subset of documents (e.g., Document 1 312 and Document 2 314) include content related to that topic (e.g., Topic D 418) A topic intensity of value of zero may also indicate that no users (e.g., zero) are viewing documents including content related to that topic.

Topic intensity values 430 for documents in a document set at time one 404 (e.g., T=1) including a topic A intensity 432, a topic B intensity 434, a topic C intensity 436, and topic D intensity 438 may be generated and stored. A topic intensity for Topic A 432 (e.g., 2.0) at time T=1 may be, for example, a sum of a product of a Document 1 user activity value 352 (e.g., 5 users) and a weight of Topic A in Document 1 262 (e.g., 0.4) and a Document 2 user activity value 354 (e.g., 3 users) and a weight of Topic A in Document 2 (e.g., 0.0). A topic intensity for Topic B 434 (e.g., 3.9) at time T=1 may be, for example, a sum of a product of a Document 1 user activity value 352 (e.g., 5 users) and a weight of Topic B in Document 1 264 (e.g., 0.60) and a product of a Document 2 user activity value 354 (e.g., 3 users) and weight of topic B in Document 2 272 (e.g., 0.30). Similarly, a topic intensity for Topic C 436 (e.g., 1.8) at time T=1 and a topic intensity for Topic D 438 (e.g., 0.3) may be generated.

Topic intensity values 440 for documents in a document set at time two 406 (e.g., T=2) including a Topic A intensity 442, a Topic B intensity 444, a Topic C intensity 446, and Topic D intensity 448 may be generated and stored. A topic intensity for Topic A 442 (e.g., 3.3) at time T=2 may be, for example, a sum of a product of a Document 1 user activity value 372 (e.g., 11 users) and a weight of Topic A in Document 1 282 (e.g., 0.3) and a Document 2 user activity value 374 (e.g., 8 users) and a weight of Topic A in Document 2 (e.g., 0.0). A topic intensity for Topic B 444 (e.g., 11.7) at time T=2 may be, for example, a sum of a product of a Document 1 user activity value 372 (e.g., 11 users) and a weight of Topic B in Document 1 274 (e.g., 0.70) and a product of a Document 2 user activity value 374 (e.g., 8 users) and weight of topic B in Document 2 292 (e.g., 0.50). Similarly, a topic intensity for Topic C 446 (e.g., 2.4) at time T=2 and a topic intensity for Topic D 448 (e.g., 1.6) may be generated.

Figure 5:
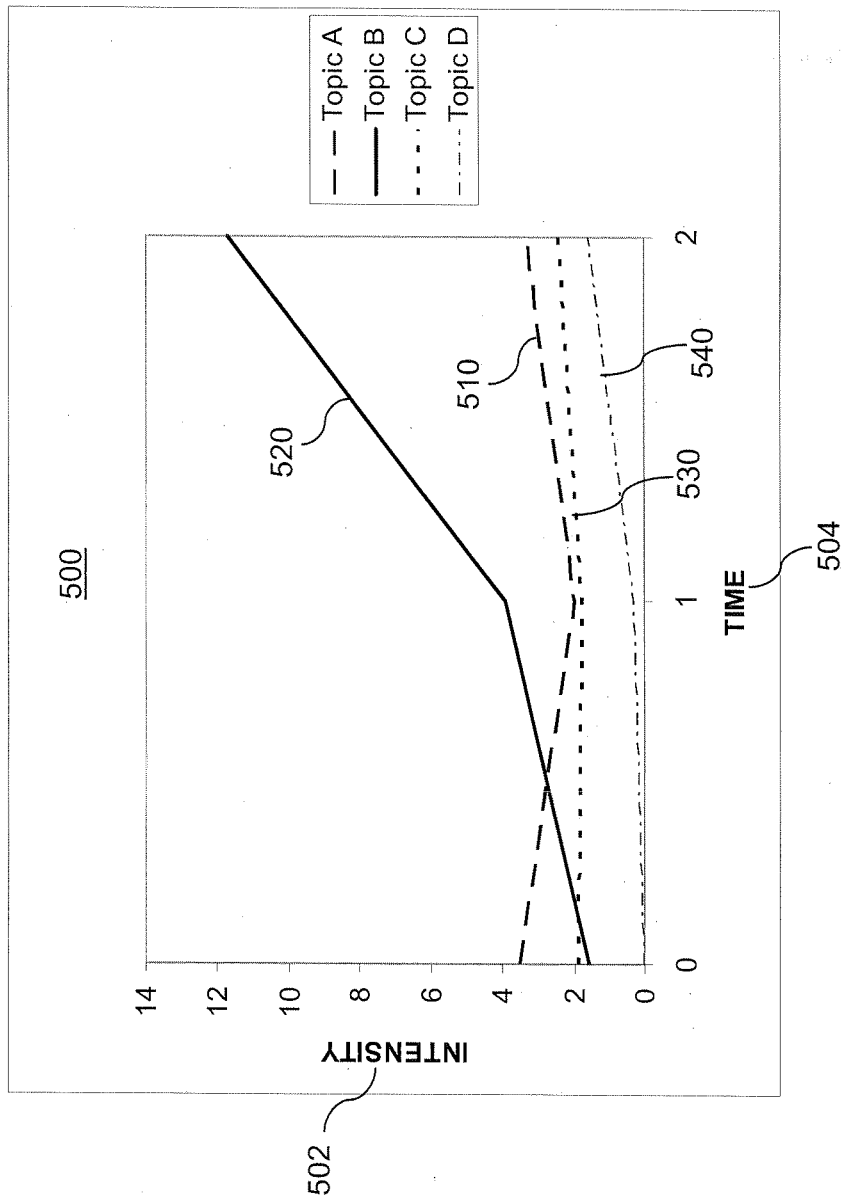
FIG. 5 is a plot of topic intensity over time according to aspects of the present disclosure.

FIG. 5 shows a plot 500 of topic intensities over time according to aspects of the present disclosure. Topic intensity 502 as a function of time 504 may graphically illustrate and/or represent trends, popularity, or other information related to document topics within one more documents in a set of documents. Topic intensity over time may represent user (e.g., editor(s), viewer(s), or other document users) trends with respect to that topic. Topic interest over time may be, for example, a metric and/or representation of overall interest in a topic within a subset of documents (e.g., Document 1 and Document 2). Topic intensities may, for example, increase, decrease, or remain constant of time. Topic intensities may, for example, increase and/or decrease at different rates over time. If, for example, a topic intensity rate of change exceeds a predetermined threshold rate of topic intensity change, that topic may be deemed a trending, hot, fast-moving, and/or popular topic.

Topic A intensity 510 may, for example, decrease between time T=0 and T=1 (e.g., from 3.5 to 2.0) from and may increase between time T=1 and time T=2 (e.g., from 2.0 to 3.3). Topic A intensity 510 may remain relatively constant between time T=0 and T=2 indicating steady user (e.g., editor, viewer, or other user) interest in Topic A and that Topic A is likely not a trending topic.

Topic B intensity 520 may, for example, increase between time T=0 and time T=1 (e.g., 1.6 to 3.9). Topic B intensity 520 may increase at high rate between time T=1 and time T=2 (e.g., 3.9 to 11.7). A change in Topic B intensity 520 between T=1 and T=2 may, for example, indicate that Topic B is a trending topic. The rate of increase in topic B interest 520 may, for example, exceed a threshold intensity rate. For example, a predetermined threshold rate may be five (e.g., 5 topic intensity points per time step), and Topic B intensity 520 may increase at rate of 7.8 (e.g., 7.8 topic intensity points per time step=(11.7 points–3.9 points)/1 time step)) between time T=1 and T=2. Because topic B intensity 520 increases at a rate (e.g., 7.8 intensity points per time step) above a predefined threshold rate (e.g., 5 intensity points per time step), Topic B may be determined to be a trending topic. An identity of Topic B and/or a subset of documents (e.g., Document 1 and Document 2) associated with Topic B, a trending topic, may, for example, be output to a user, system 600, or other system or device.

Topic C intensity 530 may, for example, decrease slightly between time T=0 and time T=1 (e.g., from 1.9 to 1.8) and may increase slightly between time T=1 and time T=2 (e.g., from 1.8 to 2.4). Topic C intensity 530 between time T=0 and T=2 may be relatively constant indicating that Topic C is likely not a trending topic.

Topic D intensity 540 may, for example, increase slightly between time T=0 and time T=1 (e.g., from 0.0 to 0.3) and may increase slightly between time T=1 and time T=2 (e.g., from 0.3 to 1.6). Topic D intensity 540 between time T=0 and T=2 may be relatively constant indicating that Topic D is likely not a trending topic.

FIG. 6 shows an illustrative computer system 600 suitable for implementing methods and systems according to an aspect of the present disclosure. The computer system may comprise, for example, a computer running any of a number of operating systems. The above-described methods of the present disclosure may be implemented on the computer system 600 as stored program control instructions.

Computer system 600 includes processor 610, memory 620, storage device 630, and input/output structure 640. One or more input/output devices may include a display 645. One or more busses 650 typically interconnect the components, 610, 620, 630, and 640. Processor 610 may be a single or multi core.

Processor 610 executes instructions in which aspects of the present disclosure may comprise steps described in one or more of the Figures. Such instructions may be stored in memory 620 or storage device 630. Data and/or information may be received and output using one or more input/output devices.

Memory 620 may store data and may be a computer-readable medium, such as volatile or non-volatile memory, or any transitory or non-transitory storage medium. Storage device 630 may provide storage for system 600 including for example, the previously described methods. In various aspects, storage device 630 may be a flash memory device, a disk drive, an optical disk device, or a tape device employing magnetic, optical, or other recording technologies.

Input/output structures 640 may provide input/output operations for system 600. Input/output devices utilizing these structures may include, for example, keyboards, displays 645, pointing devices, and microphones—among others. As shown and may be readily appreciated by those skilled in the art, computer system 600 for use with the present disclosure may be implemented in a desktop computer package 660, a laptop computer 670, a hand-held computer, for example a tablet computer, personal digital assistant, mobile device, or smartphone 680, or one or more server computers that may advantageously comprise a "cloud" computer 690.

The systems and methods discussed herein and implemented using, for example, system 600, may be used to compute information and data related to billions of individual documents associated with millions of individual users in real-time. Individual users, for example, may each store, edit, modify, and otherwise manipulate thousands of documents. In some aspects of the present disclosure, generation, calculation, computation, determination and other methods and system operations discussed herein may be completed in parallel, simultaneously or in real-time for millions of individual users worldwide and/or globally.

At this point, while we have discussed and described the disclosure using some specific examples, those skilled in the art will recognize that our teachings are not so limited. Accordingly, the disclosure should be only limited by the scope of the claims attached hereto.

The invention claimed is:

1. A computer-implemented method for determining active topics, comprising:
   receiving, at a computer system, topic information for a document, the information including at least one topic and a weight for each topic, where the topic relates to content of the document, and the weight represents how strongly the topic is associated with the document;
   receiving user activity information for the document, including a user activity value including at least one of a number of viewers and a number of editors of the document;
   generating and storing a topic intensity for each topic by multiplying the user activity value for the document by the weight of the topic in the document;
   monitoring the topic intensity over time by comparing a short term average of stored topic intensity values to a long term average of the same stored topic intensity values using a short term average/long term average (STA/LTA) approach;
   generating an alert based on the topic intensity; and
   outputting the alert if the comparison exceeds a threshold topic intensity.

2. The method of claim 1, wherein generating the alert comprises:
   generating a viewer alert based on a viewer topic intensity for each topic, where the viewer topic intensity comprises a product of a number of viewers of the document and the weight of the topic in the document.

3. The method of claim 1, wherein generating the alert comprises:
   generating an editor alert based on an editor topic intensity for each topic, where the editor topic intensity comprises a product of a number of editors of the document and the weight of the topic in the document.

4. The method of claim 1, wherein the alert is generated when the topic intensity for one topic reaches a threshold level or changes at a threshold rate.

5. The method of claim 4, further comprising:
   outputting an identity of a subset of topics, based on topic intensity, in response to user input, where the subset includes one or more topics each with a topic intensity above the threshold level or topic intensity rate of change above the threshold rate.

6. The method of claim 4, wherein:
   the threshold level includes an automatically generated threshold level based on one or more stored topic intensities; and
   the threshold rate includes an automatically generated threshold rate based on one or more stored topic intensities.

7. The method of claim 1, further comprising:
   repeating the steps of receiving topic information and receiving user activity information for a plurality of documents;
   receiving identification of a selection of a subset of the plurality of documents;
   generating and storing topic intensity for the subset of documents;
   monitoring the topic intensity over time; and
   generating an alert based on the topic intensity.

8. The method of claim 7, wherein the selection of the subset of documents is generated in response to user input.

9. The method of claim 7, further comprising:
   determining one or more trending topics based on the monitored topic intensity, where trending topics include topics associated with a topic intensity rate of change above a predetermined threshold rate; and
   outputting the identity of one or more subsets of documents associated with at least one trending topic.

10. The method of claim 7, further comprising:
    identifying one or more common attributes associated with the subset of documents; and
    outputting the common attributes to a user.

11. The method of claim 10, wherein the attributes comprise user characteristics.

12. The method of claim 10, wherein the attributes are identified in response to a user request regarding a query topic.

13. A computer-implemented system for determining active topics, comprising:
    a non-transitory memory; and
    said system configured to:
       receive topic information for a document, the information including at least one topic and a weight for each topic, where the topic relates to content of the document, and the weight represents how strongly the topic is associated with the document;
       receive user activity information for the document, including a user activity value including at least one of a number of viewers and a number of editors of the document;
       generate and store a topic intensity for each topic by multiplying the user activity value for the document by the weight of the topic in the document;
       compare a short term average of stored topic intensity values to a long term average of the same stored topic intensity values using a short term average/long term average (STA/LTA) approach;
       generate an alert based on the topic intensity; and
       output the alert if the comparison exceeds a threshold topic intensity.

14. The system of claim 13, wherein the alert is generated when the topic intensity for one topic reaches a threshold level or changes at a threshold rate.

15. The system of claim 14, further configured to:
    output an identity of a subset of topics, based on topic intensity, in response to user input, where the subset includes one or more topics each with a topic intensity above the threshold level or topic intensity rate of change above the threshold rate.

16. The system of claim 14, wherein:
    the threshold level includes an automatically generated threshold level based on one or more stored topic intensities; and
    the threshold rate includes an automatically generated threshold rate based on one or more stored topic intensities.

17. A non-transitory computer storage medium having computer executable instructions which when executed by a computer cause the computer to perform operations comprising:
    receiving a selection of a plurality of documents from a user;
    receiving topic information for one of the selected documents, the information including at least one topic and a weight for each topic, where the topic relates to content of the document, and the weight represents how strongly the topic is associated with the document;
    receiving user activity information for the document, including a user activity value including at least one of a number of viewers and a number of editors of the document;

generating and storing a topic intensity for each topic by multiplying the user activity value for the document by the weight of the topic in the document;

monitoring the topic intensity over time by comparing a short term average of stored topic intensity values to a long term average of the same stored topic intensity values using a short term average/long term average (STA/LTA) approach;

generating an alert based on the topic intensity and outputting the alert if the comparison exceeds a threshold topic intensity.

18. The non-transitory computer storage medium of claim 17, which further causes the computer to perform a further operation comprising:

repeating the steps of receiving topic information and receiving user activity information for remaining selected documents;

receiving identification of a selection of a subset of the remaining selected documents;

generating and storing topic intensity for the subset of documents;

monitoring the topic intensity over time; and generating an alert based on the topic intensity.

* * * * *